United States Patent [19]
Lawrence et al.

[11] Patent Number: 5,819,173
[45] Date of Patent: Oct. 6, 1998

[54] DYNAMICALLY RECONFIGURABLE WIRELESS COMMUNICATOR

[75] Inventors: Christopher Gregory Lawrence, Kirkland; Michael Allen Raffel, Redmond, both of Wash.

[73] Assignee: AT&T Wireless Services, Inc., Middletown, N.J.

[21] Appl. No.: 644,638

[22] Filed: Apr. 30, 1996

[51] Int. Cl.$^6$ ................................................. H04Q 7/00
[52] U.S. Cl. ........................ 455/414; 455/517; 455/403
[58] Field of Search ................................. 455/414, 403, 455/426, 465, 466, 450, 435, 550, 422, 432, 517, 67.1, 434, 443

[56] References Cited

U.S. PATENT DOCUMENTS

| | | | |
|---|---|---|---|
| 5,353,332 | 10/1994 | Raith et al. | 455/444 |
| 5,590,397 | 12/1996 | Kojima | 455/414 |
| 5,613,213 | 3/1997 | Naddell et al. | 455/414 |
| 5,655,003 | 8/1997 | Erving et al. | 455/435 |
| 5,666,364 | 9/1997 | Pierce et al. | 455/466 |

*Primary Examiner*—Dwayne D. Bost
*Assistant Examiner*—Tracy M. Legree

[57] ABSTRACT

A method and apparatus is provided for communicating on a wireless network which offers a selected service. In accordance with the method, a wireless communicator is tuned to a first signaling control channel broadcast by a wireless network. The first channel identifies one or more services provided over that network. This procedure is repeated for successive signaling control channels until a wireless network providing the selected service is identified. Once this has been identified, communication is conducted between the wireless communicator and the network.

33 Claims, 1 Drawing Sheet

DYNAMICALLY RECONFIGURABLE WIRELESS COMMUNICATOR

TECHNICAL FIELD OF THE INVENTION

This invention relates to communications systems, and more specifically, to a wireless end-user device that is dynamically reconfigurable.

BACKGROUND OF THE INVENTION

A wireless telephone communication system typically provides services to a geographic area by dividing the area into many smaller individual radio coverage areas, known as cells in a cellular system, each of which is serviced by a transmitter-receiver station, known as a cell site. The cell sites are connected through landlines or other communication links, to so-called mobile telephone switching offices (MTSO's) which are, in turn, connected to the public switched telephone network (PSTN). Any given area is typically serviced by up to two competing wireless carriers each providing a wireless system.

As more users rely on wireless systems for delivery of communications services, many of those users are increasingly demanding from their wireless carriers at least the same sophisticated communications service features that are available from their wireline networks. In response to this need of the marketplace, some wireless carriers have enhanced their switching systems to provide features, such as call waiting, call forwarding and three-way calling, to name a few. In addition, interconnection of wireless networks allows wireless subscribers to access their pre-subscribed communications services features even when they are roaming in another wireless communications carrier's service area. In spite of these developments, a wireless user is still unable to dynamically select a communications service feature that is not pre-subscribed by the user. The unavailability of non-pre-subscribed service features stems from a variety of factors, not the least of which is the inability of a wireless communicator to dynamically select on a call-by-call basis a wireless communications carrier or network that offers the desired service feature.

In an attempt to address this problem, some wireless communicator manufacturers have included in their telephone sets multiple Number Assignment Modules (NAMs) to support subscriptions to services from multiple carriers. A NAM is a memory location within the wireless communicator in which an installer technician stores an assigned telephone number and a System Identification Number (SID) which uniquely identifies a particular wireless network which is primarily intended to provide airtime service for that communicator. A conventional wireless communicator determines whether at any given time it is located within its home local service area by scanning certain frequencies to receive SIDs broadcast by wireless networks and then comparing the received SIDs to SIDs stored in the NAM.

While the provision of a NAM allows the communicator to identify the primary network to which it is pre-subscribed, it does not allow the communicator to select a network based on the availability of a desired service feature. Rather, the wireless user must possess a priori knowledge of which service feature is provided by which network. Hence, it is a continuing problem for wireless users to transparently access service features from different wireless carriers without pre-subscription to each one of those wireless carriers.

SUMMARY OF THE INVENTION

The present invention provides a method and apparatus for communicating on a wireless network providing a selected service. In accordance with the method, a wireless communicator is tuned to a first signaling control channel broadcast by a wireless network. The first channel identifies one or more services provided over that network. This procedure is repeated for successive signaling control channels until a wireless network providing the selected service is identified. Once this has been identified, communication is conducted between the wireless communicator and the network.

In an alternative embodiment of the invention, the first channel is broadcast in a radio coverage area such as a cell and identifies one or more services provided by a wireless network in the radio coverage area. The wireless communicator tunes to the first channel and then to successive channels which identify one or more services provided by successive wireless networks in the radio coverage area. This procedure is continued until a given channel is located that identifies the selected service. Communication then commences between the wireless communicator and the wireless network broadcasting the given channel.

BRIEF DESCRIPTION OF THE DRAWING

The sole FIGURE shows a simplified block diagram of wireless communicator constructed in accordance with the present invention.

DETAILED DESCRIPTION

Figure 1:
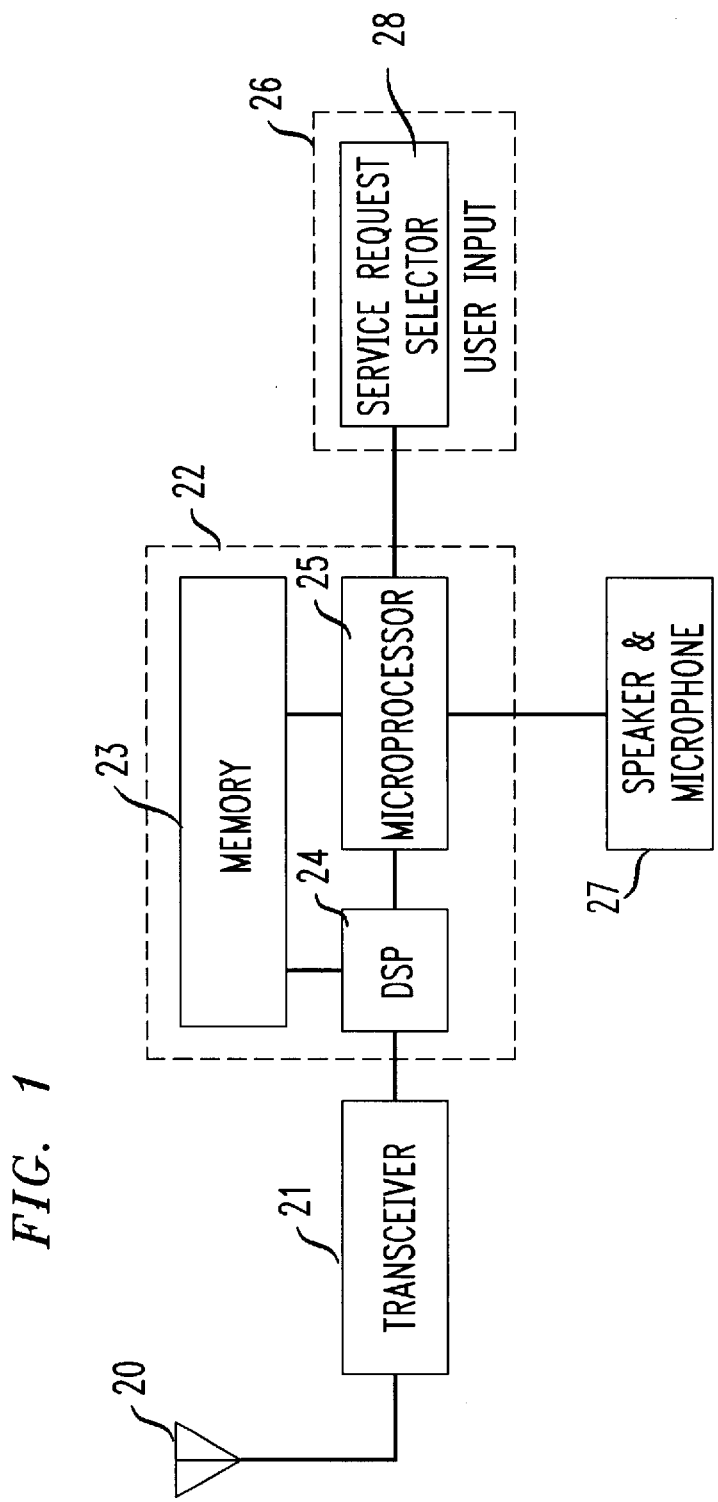

The present invention is directed to a wireless communicator that is designed to dynamically identify and select from a group of wireless networks (or, alternatively, a group of subnetworks or cells) a particular network (or subnetwork or cell) which offers or supports a communications service feature requested by a user. The user may select the service feature for a short time such as for the duration of a call or for any longer duration. After the particular wireless network is chosen by the wireless communicator, the wireless communicator automatically initiates (i.e., without the user's intervention) communication with the wireless network that provided the requested service for the delivery of the communications service feature. According to one aspect of the invention, the communications service feature requested by the user may be, for example, a cellular communications service, a Personal Communications Service (PCS), a paging or Short Message Service (SMS), or a Specialized Mobile Radio (SMR) service. The respective services may be provided by a service provider operating over the network via a service provider gateway associated therewith. Alternatively, the services may be provided by the wireless carrier itself.

In an alternative embodiment of the invention, the wireless communicator dynamically identifies and selects a radio coverage area which offers the requested service feature or features. Individual radio coverage areas, which may be cells in a cellular network, for example, are typically provided with wireless communications via two or more distinct wireless networks. The radio coverage area that is selected may be one other than the local area in which the wireless communicator is currently operating. In other words, the communicator may initiate service with a network that does not ordinarily provide local radio coverage if there is no available network normally operating in the local radio coverage area that offers the desired service feature.

FIG. 1 shows a block diagram of a wireless communicator in accordance with the present invention. The wireless communicator includes a transceiver 21, antenna 20, controller 22, a user input 26 such as a keypad, and a speaker and microphone 27. The controller 22 processes incoming and outgoing signals and includes a microprocessor 25, a digital signal processor 24 and a memory 23. The user input 26 includes a service request selector 28 which allows the user to specify to the controller 22 the service or services that are desired. The controller 22 in turn directs the transceiver 21 to monitor signaling control channels (discussed in more detail below) broadcast by various wireless networks so that communication can be established with a network that is identified as offering the desired service or services.

In one embodiment of the invention, a wireless communicator tunes to a first signaling control channel over which a wireless network broadcasts carrier-specific information such as a System Identification (SID) number and a service menu. The service menu lists the various service features available over that network, such as call waiting, dial forwarding, facsimile transmission, and three-way calling, for example. The wireless communicator browses the service menu to assess the availability of the communications service feature requested by the user via the service request selector 28. If the wireless network offers the communications service feature requested by the user, the communicator initiates a service request to the wireless network. If necessary, the wireless communicator registers onto the wireless network supporting the requested service. Alternatively, if the wireless communicator is already registered onto the appropriate network, the wireless communicator simply conducts communication with the network so that the desired service feature is provided to the user.

If the first wireless network to which the communicator tunes does not offer the communications service feature requested by the user, the communicator tunes to a second control channel to browse through the menu of the wireless network associated with the second control channel. The control channel tuning and menu-browsing process continues until the wireless communicator identifies a wireless or wired network that offers the communications service feature requested by the user or until the list of networks is exhausted. Thereafter, a service request is initiated to the identified network for delivery of the communications service feature desired by the user. As previously mentioned, the identified network may or may not be operational in the current local radio coverage area of the communicator. The user may also configure the device through an appropriate input to select from among a plurality of networks that each have the requisite service feature on an additional basis such as cost and speed, for example.

One of ordinary skill in the art will recognize that the signaling control channel defined by the present invention may be readily incorporated into any of the established digital cellular interface standards, including, but not limited to, EIA/TIA Standard 553, "Mobile Station-Land Station Compatibility Specification," September 1989, Electronic Industries Association, Washington, D.C.; EIA/TIA Interim standard IS-54-B, "Cellular System Dual-Mode Mobile Station—Basestation Compatibility Standard," April, 1992, Electronic Industries Association, Washington, D.C.; and EIA/TIA Interim Standard IS-136, "Cellular System Dual-Mode Mobile Station—Basestation: Digital Control Channel Compatibility Standard," April, 1995, Electronic Industries Association, Washington, D.C. Moreover, the IS-136 standard incorporates a digital control channel that may broadcast the SID number and a service menu.

In one embodiment of the invention, the service request selector 28 is configured so that the user can select one of three different operational states. In the first operational state, upon activation of the wireless communicator, the communicator automatically begins monitoring various signaling control channels and registers onto a wireless network that offers a preselected service or services. In a second operational state, the communicator only begins monitoring signaling control channels when the user manually selects a desired service or service. Finally, in a third operational state, the communicator begins monitoring various signaling control channels to conduct communication with a network that offers a service that the communicator itself identifies as being required. For example, if the user connects facsimile equipment through an appropriate input port of the communicator, the communicator when operating in this state, will automatically attempt to identify and communicate with a wireless network offering facsimile service. In some embodiments of the invention the service request selector 28 may offer all three of these operational states or, alternatively, any one or two of these operational states. The communicator also may be provided with status indicators such as LEDs, for example, that indicate the current operational state of the mode selector. Status indicators may also be provided to identify the selected service or services requested by the user.

We claim:

1. A method for communicating on a wireless network providing a service selected by a user on a per-call basis, said method comprising the steps of:
   (a) tuning, with a wireless communicator, to a first signaling control channel broadcast by a wireless network, said first channel identifying at least one service provided over the wireless network;
   (b) repeating step (a) for successive signaling control channels until a wireless network providing the service selected by the user is identified; and
   (c) conducting communication over said identified wireless network providing the service selected by the user.

2. The method of claim 1 wherein said at least one service is a personal communications service.

3. The method of claim 1 wherein said at least one service is a paging service.

4. The method of claim 1 wherein said at least one service is a short message service.

5. The method of claim 1 wherein said first channel includes a service menu and a system identification number.

6. The method of claim 5 wherein said service menu comprises a service selected from the group consisting of call waiting, dial forwarding, facsimile transmission, and three-way calling.

7. The method of claim 1 wherein step (c) includes the step of registering onto said wireless network.

8. The method of claim 1 wherein said first signaling control channel is included in a digital cellular interface standard.

9. A method for communicating on a wireless network providing a service selected by a user on a per-call basis, said method comprising the steps of:
   (a) tuning, with a wireless communicator, to a first signaling control channel broadcast in a radio coverage area, said first channel identifying at least one service provided by a wireless network in said radio coverage area;
   (b) repeating step (a) for successive signaling control channels until a given channel is located that identifies said service selected by the user; and
   (c) conducting communication over a wireless network broadcasting said given channel.

10. The method of claim 9 wherein at least said first signaling control channel and one of said successive signaling control channels are broadcast in different radio coverage areas.

11. The method of claim 9 wherein said at least one service is a paging service.

12. The method of claim 9 wherein said at least one service is a short message service.

13. The method of claim 9 wherein said first channel includes a service menu and a system identification number.

14. The method of claim 13 wherein said service menu comprises a service selected from the group consisting of call waiting, dial forwarding, facsimile transmission, and three-way calling.

15. The method of claim 9 wherein step (c) includes the step of registering onto said wireless network.

16. The method of claim 9 wherein said first signaling control channel is included in a digital cellular interface standard.

17. A wireless communicator, comprising:

a transceiver; and a user input for receiving user-initiated requests on a per-call basis, said user input including an enhanced service request selector for selecting a service from among of plurality of enhanced services, said transceiver, responsive to said service request selector, being adapted to monitor control signals broadcast from among a plurality of providers of wireless networks, said control signals identifying the enhanced services provided over respective ones of said wireless networks, said transceiver being further adapted to automatically identify and initiate communication over a wireless network broadcasting a control channel that identifies the selected service.

18. The communicator of claim 17 wherein said service request selector provides a plurality of user-selectable operational states, a first of said operational states.

19. The communicator of claim 18 wherein in a first of said operational states the communicator automatically performs the steps of:

(a) tuning, with the wireless communicator, to a first signaling control channel broadcast in a radio coverage area, said first channel identifying at least one service provided by a wireless network in the radio coverage area;

(b) repeating tuning for successive control channels until a given channel is located that identifies a service selected by the user; and (c) conducting the communication over a wireless network broadcasting said given channel;

upon activation for a preselected service.

20. The communicator of claim 19 wherein in a second of said operational states the communicator performs steps (a)–(c) subsequent to activation and upon manual selection of the user.

21. The communicator of claim 20 wherein in a third of said operational states the communicator automatically performs step (a)–(c) to conduct communication with a network offering a service identified by the communicator as being required.

22. The method of claim 17 wherein said at least one service is a personal communications service.

23. The method of claim 17 wherein said selected service is a paging service.

24. The method of claim 17 wherein said selected service is a short message service.

25. The method of claim 17 wherein said control signals include a service menu and a system identification number.

26. The method of claim 25 wherein said service menu comprises a service selected from the group consisting of call waiting, dial forwarding, facsimile transmission, and three-way calling.

27. A wireless communicator, comprising:

a transceiver; and a user input for receiving user-initiated requests on a per-call basis, said user input including an enhanced service request selector for selecting a service from among the plurality of enhanced services, said transceiver, responsive to said service request selector, being adapted to monitor control signals broadcast by a plurality of providers of wireless networks within at least one radio coverage area, each of said control signals identifying the enhanced services provided by the wireless networks in the radio coverage area, said transceiver being further adapted to automatically identify and initiate communication over a wireless network broadcasting a control channel that identifies the selected service.

28. The wireless communicator of claim 27 wherein said transceiver is adapted to monitor signals broadcast within a plurality of radio coverage areas.

29. The communicator of claim 27 wherein said service is a personal communications service.

30. The communicator of claim 27 wherein said service is a paging service.

31. The communicator of claim 27 wherein said service is a short message service.

32. The communicator of claim 27 wherein said control signals include a service menu and a system identification number.

33. The communicator of claim 32 wherein said service menu comprises a service selected from the group consisting of call waiting, dial forwarding, facsimile transmission, and three-way calling.

* * * * *